Nov. 30, 1971  J. BINHACK ET AL  3,623,400
DISPLACEMENT DEVICE
Filed May 14, 1970  11 Sheets-Sheet 1
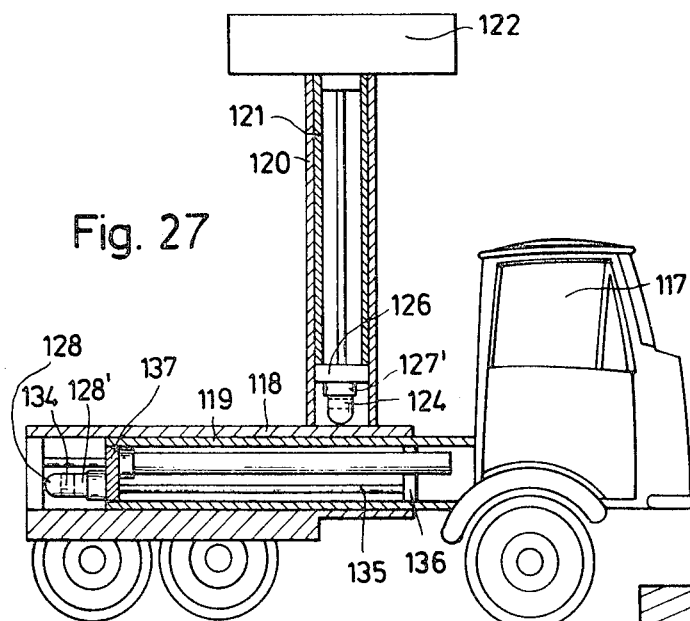
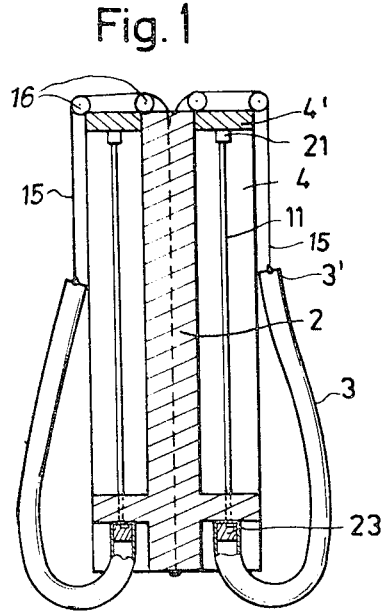
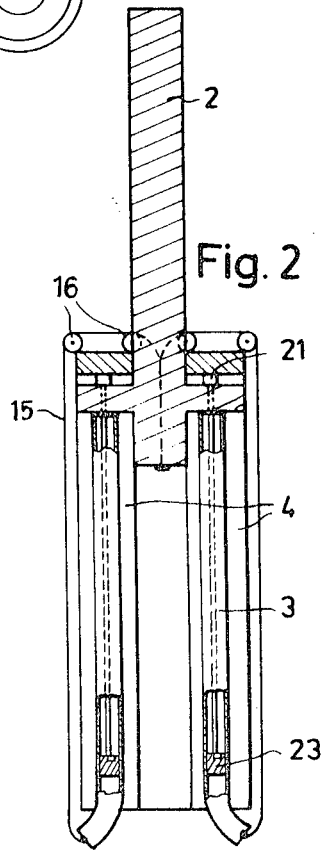
INVENTORS.
Josef Binhack
Friedrich Keilholz
BY
Spencer & Kaye
ATTORNEYS.

Nov. 30, 1971  J. BINHACK ET AL  3,623,400

DISPLACEMENT DEVICE

Filed May 14, 1970  11 Sheets-Sheet 4

INVENTORS.
Josef Binhack
Friedrich Keilholz
BY Spencer & Kaye
ATTORNEYS.

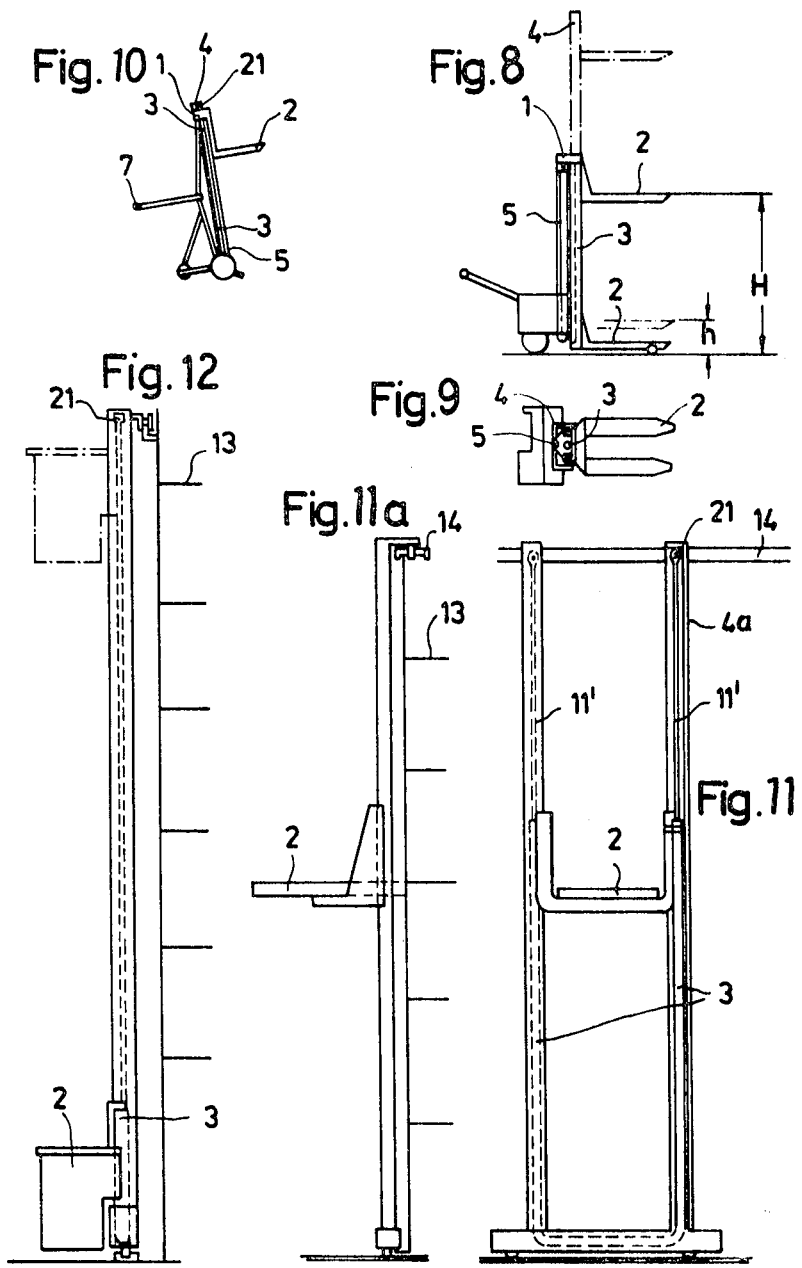

Nov. 30, 1971   J. BINHACK ET AL   3,623,400
DISPLACEMENT DEVICE
Filed May 14, 1970   11 Sheets-Sheet 6
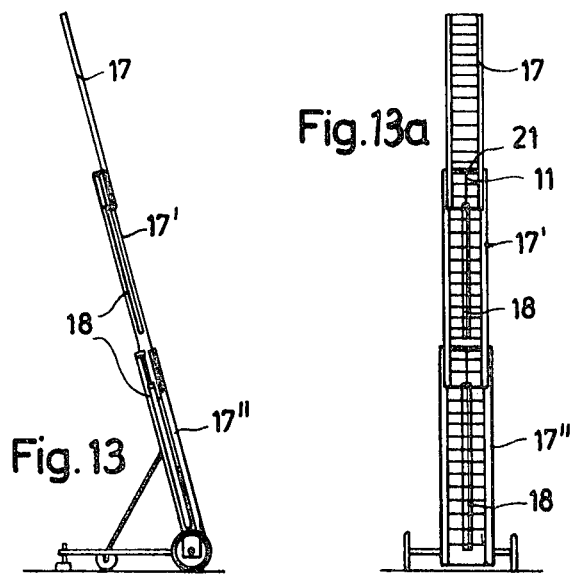
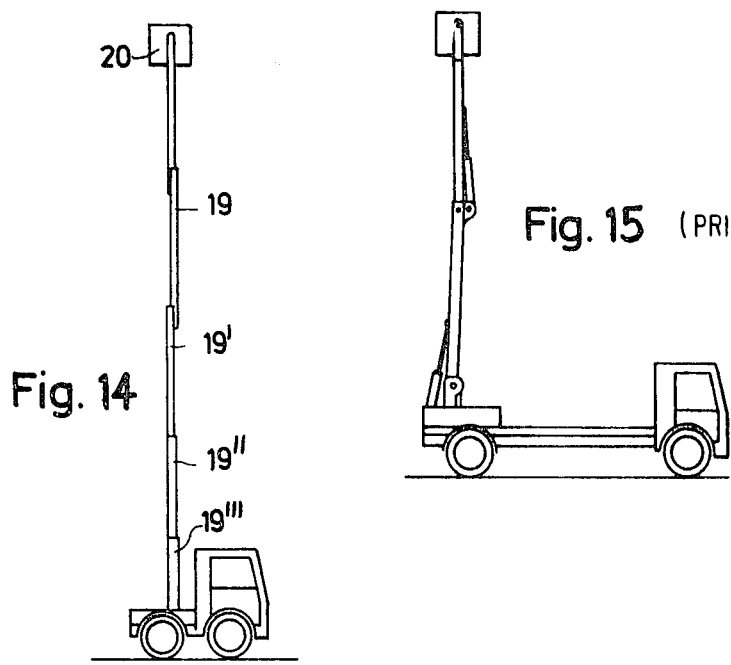
INVENTORS.
Josef Binhack
BY Friedrich Keilholz
Spencer & Kaye
ATTORNEYS.

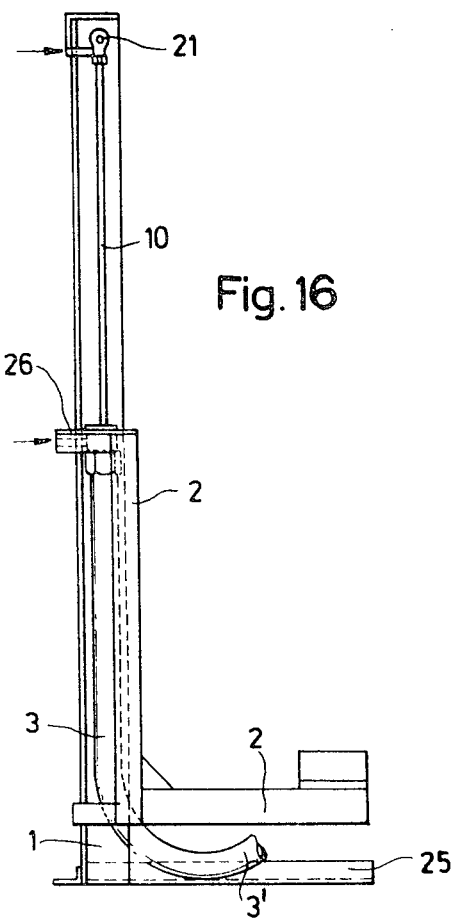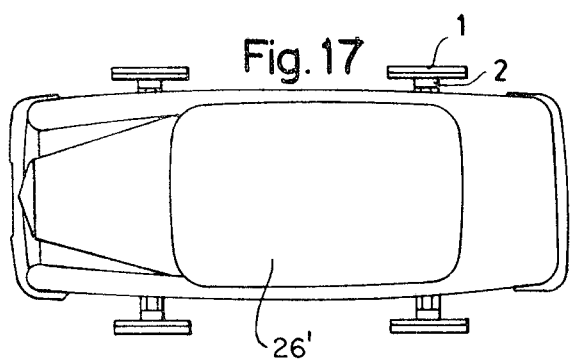

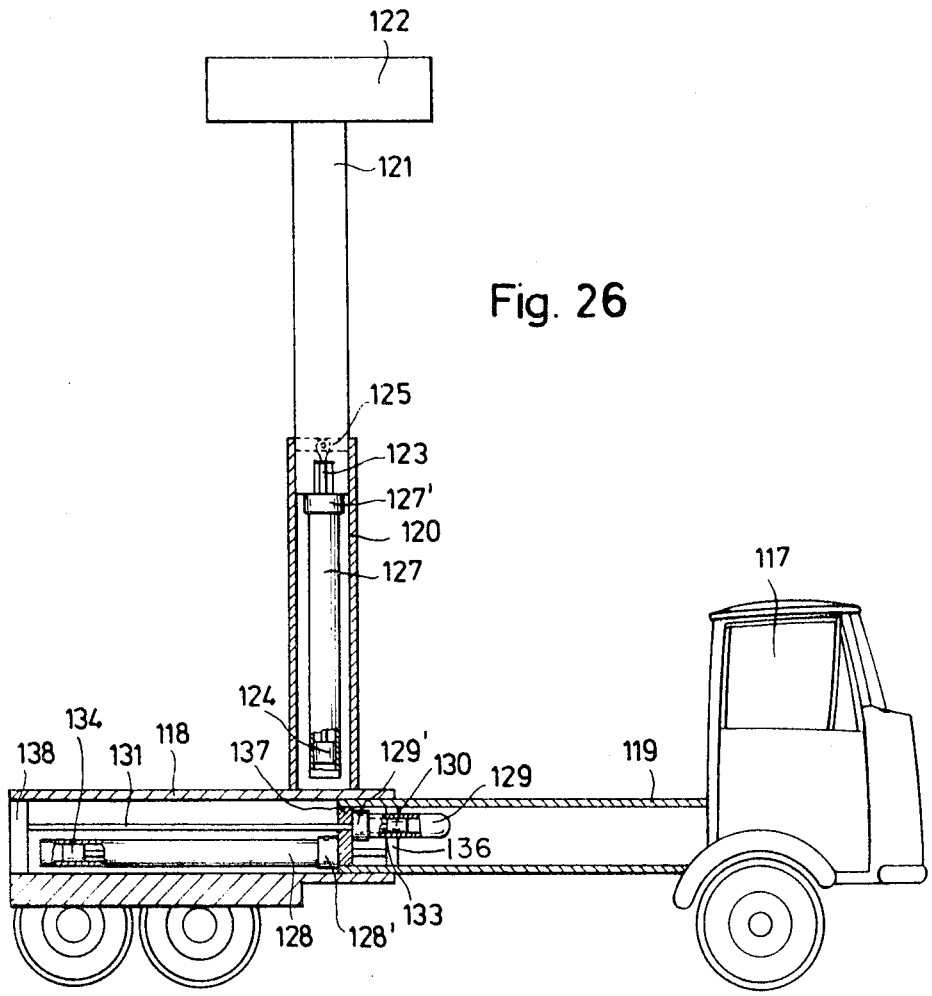

United States Patent Office 3,623,400
Patented Nov. 30, 1971

3,623,400
DISPLACEMENT DEVICE
Josef Binhack, 89 Alte Pforzheimer Strasse, D-754
Neuenburg, Germany, and Friedrich Keilholz, 1
Dohlenweg, D-5828 Ennepetal-Voerde, Germany
Filed May 14, 1970, Ser. No. 37,141
Claims priority, application Germany, May 16, 1969,
P 19 25 026.1; Aug. 14, 1969, P 19 41 397.9
Int. Cl. F15b 11/00
U.S. Cl. 91—411 R                 19 Claims

ABSTRACT OF THE DISCLOSURE

A displacement device composed of at least one piston connected to a fixed point by means of a piston rod and enclosed by a flexible cylinder guided along the piston rod at its head. A displacement unit is connected to and carried by the head of the flexible cylinder. The free end of the flexible cylinder is deflected by at least 90° and preferably 180° to facilitate its storage. Displacement of the cylinder head along the piston rod is achieved by charging the space between the cylinder head and the piston with a fluid pressure medium. To obtain greater displacements, any number of similar displacement devices may be telescoped so that each operates to displace the next succeeding device. The displacement device may be applied to lift and stacking vehicles, elevated work platforms, extension ladders, lifting devices and the like.

BACKGROUND OF THE INVENTION

The present invention relates to a displacement device having at least one piston which is jointed to a fixed point by means of a piston rod and enclosed by a flexible cylinder guided along the piston rod, the head of this cylinder being connected with a displacement unit. Such a flexible cylinder is described in the German Pat. Nos. 1,274,301 and 1,197,598. It may consist of rubber, plastic or synthetic resins and be provided with wire reinforcement.

In a known device of this type, the piston rod is fastened to the roof construction of a building in which the displacement device operates as an elevator. The section of the flexible cylinder which is not charged with pressure medium is deflected by at least 90°. However, in the development of the classic lift and stacking vehicles, elevated work platforms, extension ladders, lifting devices and the like, flexible cylinders have thus far not found acceptance. The displacement devices used in the above-mentioned applications typically employ rigid steel cylinders as their hydraulic pressure members or they are provided with rope or chain pulls which are either electrically or manually driven. When steel cylinders are used, the maximally achievable displacement path of the load is substantially less than the structural length of the displacement device, particularly with stacking vehicles and elevated work platforms. This is due to the structural length of the rigid cylinders which have the added disadvantage of being heavy. In those displacement devices that operate with electrically driven rope or chain pulls, the displacement speed can not be as smoothly regulated as is possible with hydraulic systems. If, for example, stacking shelves are to be accurately approached, it is necessary to employ expensive electrical circuits.

Although these drawbacks have been known for years in all fields of application, no one skilled in the art has been able to practically employ hydraulic devices with flexible cylinders for lifting and stacking vehicles, elevated work platforms, movable ladders, lifting devices and the like.

SUMMARY OF THE INVENTION

The present invention eliminates the above-mentioned drawbacks in the various fields of application, by providing a displacement unit (primary unit) connected to the head of a flexible cylinder to serve, for example, as the load carrier, carried along in a rollable or movable unit bearing a piston (secondary unit) enclosed by the cylinder in a telescoping manner. This secondary unit is provided with a redirecting device for the free end of the flexible cylinder, the joint of the piston rod and the piston being disposed at opposite ends of the unit bearing the piston. For some displacement units it may be advisable for the secondary unit to be mounted in a tertiary unit in a telescoping manner and to be driven by means of a flexible cylinder whose piston is borne by this tertiary unit and perhaps for the tertiary unit to be mounted in a telescoping manner in a quaternary unit and driven by a cylinder whose piston is borne by this quaternary unit and so forth. In order to make the displacement device more versatile in its use, for example to permit the displacement of large loads, the cylinders disposed in the secondary, tertiary or quaternary unit having polygonal or circular cross sections lie in different planes or on circular arcs.

BRIEF DESCRIPTION OF THE DRAWINGS

FIGS. 1 and 2 are simplified cross-sectional views illustrating the basic displacement device according to the invention in two operating states.

FIG. 8 is a side view of an extra-height lift for the moving of goods within the plant with a maximally raised lifting carriage, the free lift of conventional extra-height lifts being indicated with h and the extended telescope mast being shown in dot-dashed lines.

FIG. 9 shows the extra-height lifting according to FIG. 8 in a plan view.

FIG. 10 is a side view of a smaller, mobile stacker.

FIG. 11 is a front view of a shelf serving device.

FIG. 11a is a side view of the shelf serving device of FIG. 11.

FIG. 12 shows a warehouse lift for the loading of compartments in warehouses, only the entrance region of the compartments being shown in the drawing for the sake of clarity.

FIG. 13 is a side view of a mobile extension ladder.

FIG. 13a is a frontal view of the extension ladder of FIG. 13.

FIG. 14 shows a hydraulically extendable elevated work platform, e.g., for the installation and repair of electrical lines at high-rise structures.

FIG. 15 shows a conventional hydraulic elevated work platform.

FIGS. 16 and 17 show a lifting device for lifting a motor vehicle.

FIGS. 26 and 27 show an application of the invention to provide both vertical and horizontal displacements in a mobile, elevated work platform.

DESCRIPTION OF THE PREFERRED EMBODIMENTS

Figure 3:
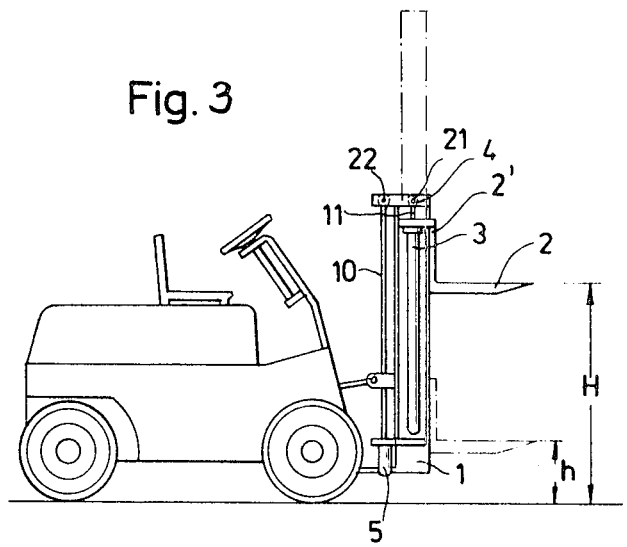
FIG. 3 shows a lifting and stacking device in a side view with the lift carriage in the maximum raised position, a lift carriage shown in dot-dashed lines indicating the free lift for conventional lifts.

Referring now to the drawings wherein like reference numerals designate identical or corresponding parts throughout the several views, the operating principle common to all embodiments is shown in the schematic diagram of FIGS. 1 and 2. At least two structural units, primary unit 2 and secondary unit 4 disposed one inside the other, are displaceable with respect to one another by means of a hydraulic or pneumatic device. This device comprises pistons 23, whose hollow piston rods 11 are journaled to the top 4' of the secondary unit 4 through hollow fixed couplings 21. Pistons 23 are enclosed by flexible cylinders 3 guided at their head on the piston rods 11, the cylinders being chargeable with a pressure medium via hollow rod 11 and a passage in piston 23, for example. The heads of the flexible cylinders 3 are connected with the primary unit 2. For reasons of space economy, the cylinder ends 3' are bent over when the primary unit 2 is moved from the extended position shown in FIG. 2 into the retracted position shown in FIG. 1. The bending may be accomplished, for example, by means of a rigid rope tow or, as shown in the diagram of FIGS. 1 and 2, by means of rope pulls 15. Alternatively, rubber band tension or spring tension may be used. The rope pulls brought over rollers 16 are fastened at their one end to the free cylinder ends 3' and at their other end to the primary unit 2 or to the heads of cylinders 3.

In the lifting and stacking vehicle according to FIGS. 3 to 7, three rigid structural units are provided, i.e. the load carriage 2 serving as the primary unit, the telescope mast 4 serving as the secondary unit and the basic mast 1 serving as the tertiary unit. The load carriage 2 which carries the load and is designed as an angle is fastened at its upper end 2' to the head of two cylinders 3 which are mounted symmetrically to the center line A—A of the device. These cylinders 3 are disposed at the longitudinal branches of the frame-type pair of telescope masts 4 which have a rectangular cross section. The cylinders enclose pistons 23 which are jointed with their piston rods to the fixed points 21 of the associated telescope mast. Before the telescope mast is extended, the load carriage 2 can be lifted from the level shown in FIG. 6 to the level H shown in FIG. 3 by charging the flexible cylinders 3 with a pressure medium. The pair of telescope masts 4 are fastened to the heads of cylinders 5 which are also disposed symmetrically to the center line A—A of the device along the longitudinal branches of the pair of basic masts 1 which are also constructed in the form of frames. Rods 10 of pistons 24, which pistons are enclosed by cylinders 5, are jointed to the fixed points 22 of the pair of basic masts 1.

Figure 4:
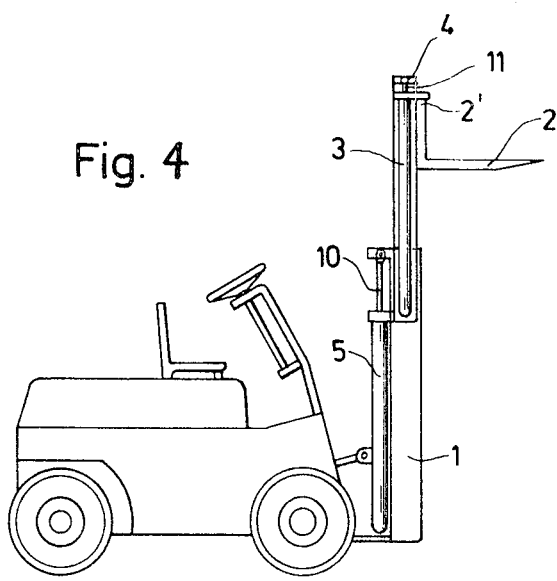
FIG. 4 shows the lifting and stacking device according to FIG. 3 with the telescope mast in its extended position.
Figure 5:
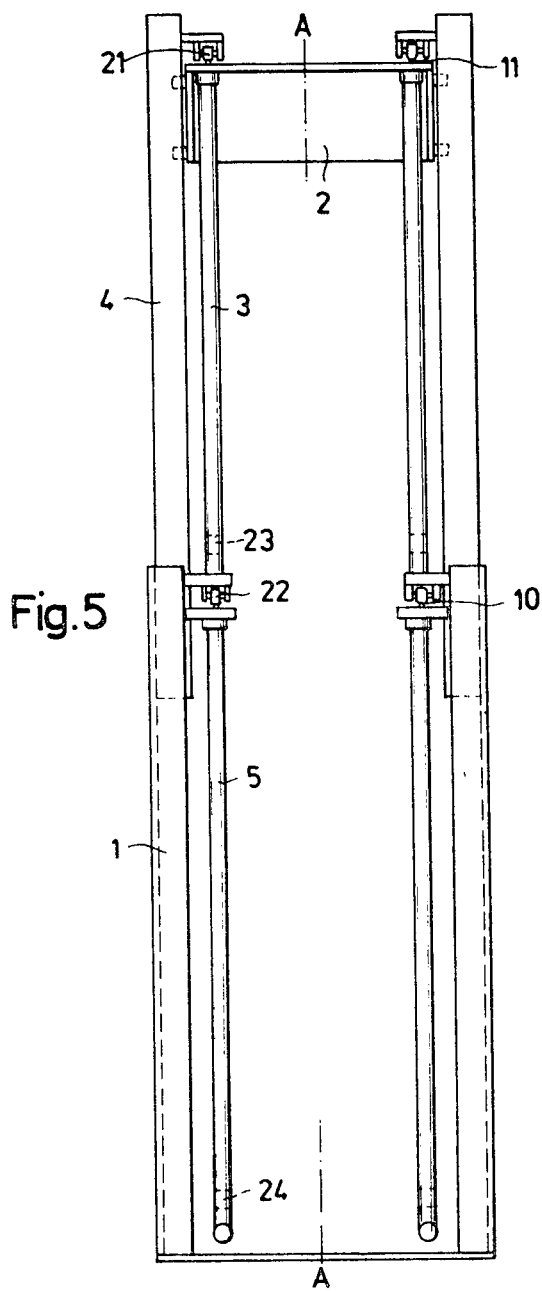
FIG. 5 shows the lifting frame, consisting of basic mast and telescope mast, in the extended position for the lifting and stacking device of FIGS. 3 and 4 in a frontal view at an enlarged scale.
Figure 6:
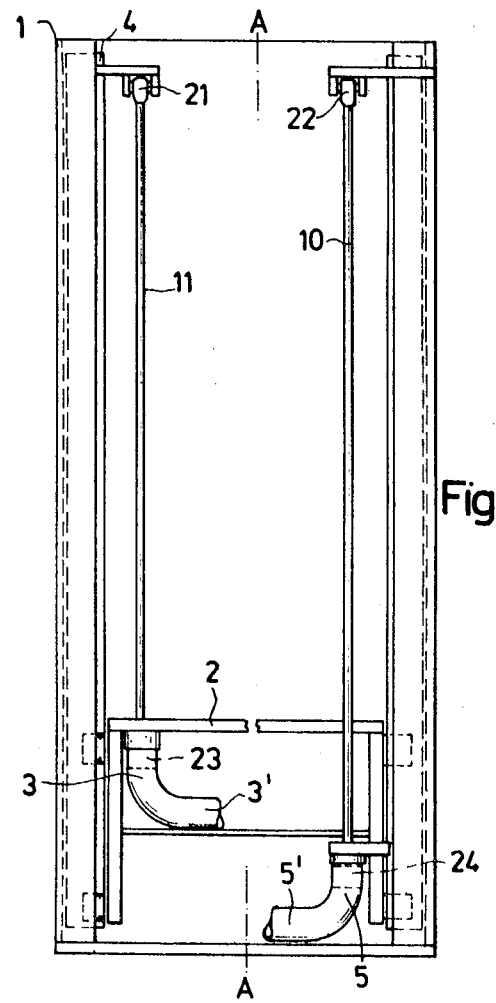
FIG. 6 is a front view showing the lifting frame in its retracted position.

As shown in FIG. 6 the horizontal load forks of the lifting carriage 2 (which for reasons of clarity are not shown) rest at the bottom. If the cylinder chambers disposed above pistons 23 of cylinders 3 are charged with pressure medium, the load carriage 2 is lifted to a position shown in FIG. 3 designated free lift H. If then the cylinder chambers in cylinders 5 disposed above pistons 24 are charged with pressure medium, the telescope mast telescopically housed in the basic mast 1 is extended as shown in FIGS. 4 and 5. Due to the frame-type construction, the center region of the pairs of masts is free for the driver to see through so that he may check at any time whether or not the load is stacked on the load carriage in an orderly fashion.

Figure 6A:
FIG. 6a is a side view showing the same lifting frame in its retracted position.
Figure 7:
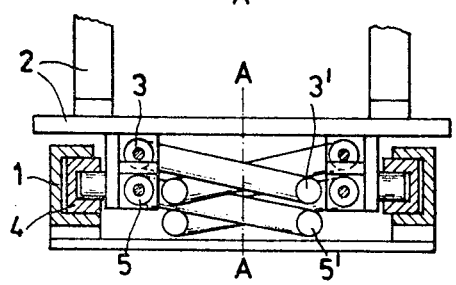
FIG. 7 is a plan view of a cross section of the lifting frame of FIGS. 5 and 6.

As can be seen particularly in FIGS. 6, 6a and 7, the free cylinder ends 3' or 5', are curved by approximately 180° when the load carriage or the pair of telescope masts are retracted. They might cross in the center plane A—A as shown particularly in FIG. 7. During deflection, the free cylinder ends are each brought along a rope tow passing over their respective mast of the pair of masts 4 and 1.

Construction and operation of the extra-height lifting vehicle shown in FIGS. 8 and 9 correspond to construction and operation of the just described lifting and stacking device. Here too, as with the lifting and stacking device, a plurality of telescope masts may be provided if required. As can be seen in FIG. 8, the load carriage 2 and the telescope frame 4 are each lifted, in contradistinction to the lifting and stacking device which is provided with two hydraulic devices disposed symmetrically with respect to the center plane A—A, by a single flexible cylinder 3 or 5, respectively, which is disposed in the center plane of the device.

The manually movable small stacker of FIG. 10 may be equipped with a small hydraulic pump whose electric motor is driven by an electric battery. The load carriage 2 and the telescope frame 4 are extended according to the same operating principle as in the case of the lifting and stacking device shown in FIGS. 3 to 7.

With the shelf serving device shown in FIGS. 11 and 11a, the load material is loaded, for example in a warehouse, into the individual compartments 13, the load carriage 2 being lifted to correspond with the individual levels of the compartments. For this purpose a two-armed mast 4a is provided which can be guided along the shelves by means of rails disposed at the top and bottom of the shelf units. The operating principle according to the present invention permits raising the load carriage up to the top shelf. A particular advantage can be seen in the possibility of a smooth regulation and accurate approach of the compartments 13.

With the warehouse lift shown in FIG. 12, which operates according to the same principle, the individual compartments 13 in the warehouse stock room can be accurately approached since smooth regulation of the speed of the vehicle is possible.

With the movable extension ladder shown in FIGS. 13 and 13a, the individual ladders 17, 17', 17'' can be extended one after the other. This is done faster than with the conventional system by means of flexible cylinders 18. The extension speed can be smoothly regulated. Moreover, accurate approach of a target point is possible with the free end of the ladder. The flexible cylinders may be disposed at random in the framework of the individual ladders. The piston rods of the pistons enclosed by flexible cylinders 18 are each suspended at the upper end of the associated ladder, the cylinder head of the associated cylinder being connected with the lower end of the adjacent ladder and extending this ladder when the cylinder is charged with pressure medium.

For the elevated work platform shown in FIG. 14, a number of telescope-type mast sections 19, 19', 19'' and 19''', one inserted inside the other, and having U-shaped profiles, are extended with the aid of flexible cylinders in order to bring the work platform 20 into the desired elevated position. The conventional hydraulic elevated work platform shown in FIG. 15 shows clearly that the load bed of the associated supporting truck must be substantially longer than with the elevated work platform shown in FIG. 14.

The lift device for motor vehicles, for example, shown in FIGS. 16 and 17 comprises four identical separate devices. Only one of the devices is shown in FIG. 16 in a side view. The piston (not shown) is disposed on the piston rod which is jointed to a base mast 1 at fixed point 21, the piston being disposed at the lower end of the base mast. An angularly constructed load carriage 2 is fastened at the head of cylinder 3 where there is disposed a connection 26 for the addition of pressure medium. The base mast 1 of the movable device is provided with a stand 25 which has at least three legs. Cylinder section 3' which is released below the piston when the load carriage 2 sinks downwardly is deflected by at least 90°. As can be seen in FIG. 17, four devices of the type illustrated in FIG. 16 are applied to the motor vehicle 26' in order to lift it off the ground and they are all four charged with pressure medium to jack the vehicle up. Using a plurality of devices according to the invention has the advantage over the classic lifting platforms whose hydraulic system is disposed below the ground that it can be dissembled after use and can be removed with a minimum of effort so that the space required for lifting the vehicle is available for other purposes.

FIGS. 18 to 25 show embodiments of displacement units for a multitude of applications involving extremely large loads. These units are formed by providing cylinders belonging to a unit of polygonal or circular cross section disposed in different planes or on circular arcs. As can be seen in particular in FIGS. 24 and 25, the piston rods 31 of the pistons are fastened to one end of the unit whereas the pistons themselves are disposed at the opposite end of this unit. The pistons are enclosed by flexible cylinders 28 whose heads are linearly guided along the piston rods.

In FIGS. 18 to 23, only one unit, the primary unit, is shown for reasons of simplicity and is associated with one or a plurality of load carriages.

Figure 18:
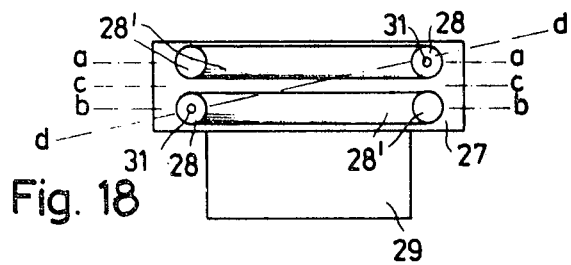
FIG. 18 is a plan view of a variation of a secondary unit having a rectangular cross section and two hydraulic cylinders, the load carriage being left off.

In the embodiment shown in FIG. 18 one unit 27 having a rectangular cross section contains two flexible cylinders 28. The heads of these cylinders are brought along a plane d—d which is not parallel to the plane of symmetry c—c of this unit. The cylinders as a whole are disposed, in every operating position, i.e., even when the cylinder ends are deflected, in parallel planes a—b, b—b, which are parallel to the plane of symmetry c—c of the unit. Consequently, it is not necessary that the deflected cylinder ends 28' cross one another when the structural unit serving as the load carriage 29 is retracted. The carriage 29 is disposed along the longitudinal side of the unit and connected with the heads of both cylinders 28.

Figure 19:
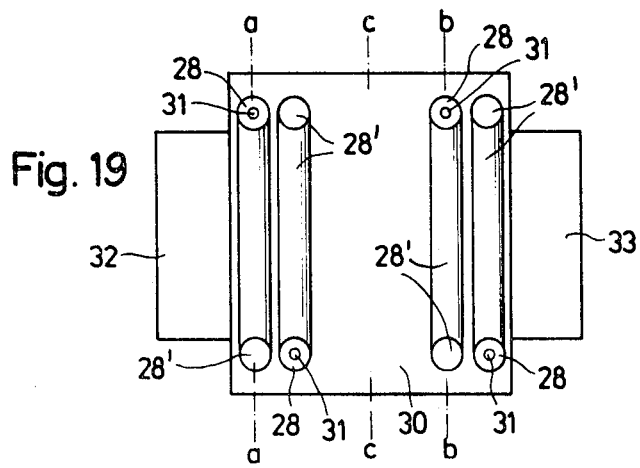
FIGS. 19 and 20 show variations of a unit having an approximately square cross section and four hydraulic cylinders together with the associated load carriage.

In the variation shown in FIG. 19 each corner of the structural unit 30 which has an approximately square cross section contains a cylinder head. All cylinders 28 of unit 30 are disposed, in each working phase, even when the cylinder ends 28' are deflected, only in parallel planes a—a, b—b, which are parallel to the plane of symmetry c—c of the unit. Two carriages 32 and 33 are disposed at two opposing sides of the unit and are connected with the adjacent cylinder heads.

Figure 20:
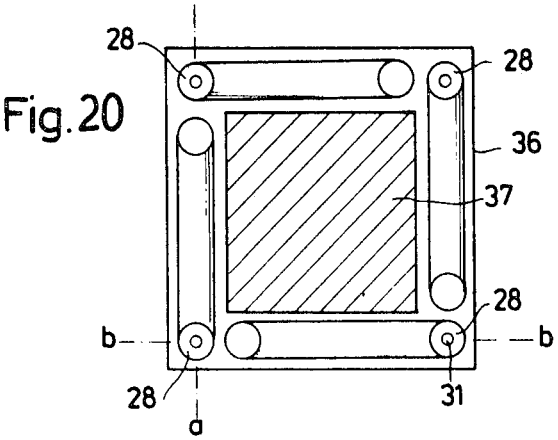

In the embodiment shown in FIG. 20 in which the unit 36 bearing cylinders 28 has an approximately square cross section, the cylinder heads are disposed in the corners of the unit and their free ends are each deflected in a direction parallel to the adjacent side wall of the unit. The carriage 37 which has a square cross section is disposed centrally within the unit. Each corner of the carriage is connected with the cylinder head disposed in the adjacent corner of the unit.

Figure 21:
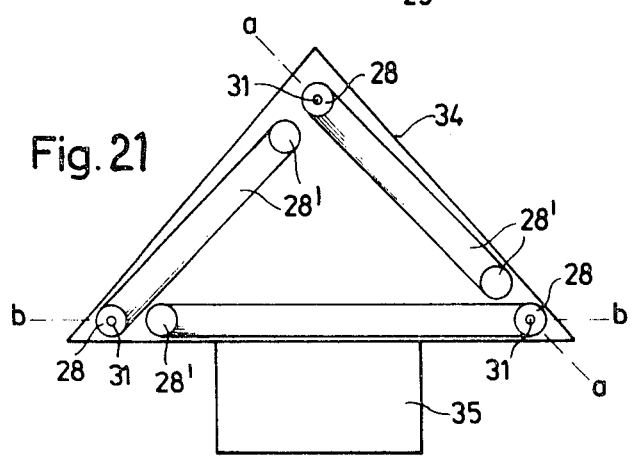
FIGS. 21 and 22 show variations with three or six hydraulic cylinders guided in a unit of triangular cross section.

In the variation shown in FIG. 21 the heads of three cylinders 28 are disposed in the corners of a unit 34 which has a triangular cross section. The free ends 28' of the cylinders are deflected approximately parallel to the side walls of the unit when the load carriage 35 is in the downward position. The carriage is disposed at one of the lateral surfaces and is connected with all of the cylinder heads.

Figure 22:
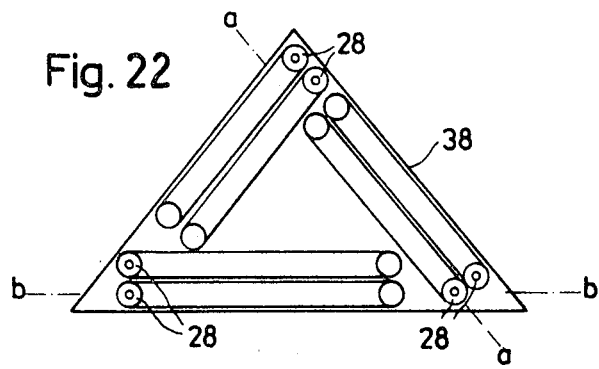

In the variation shown in FIG. 22, three pairs of cylinders are disposed in a larger unit 38 which has an approximately triangular cross section. The carriage may be disposed centrally within the composite unit, or two or three carriages may be provided which are disposed at the longitudinal sides of the unit. If a plurality of carriages are disposed in one srtuctural unit, these may be controlled independently of one another.

Figure 23:
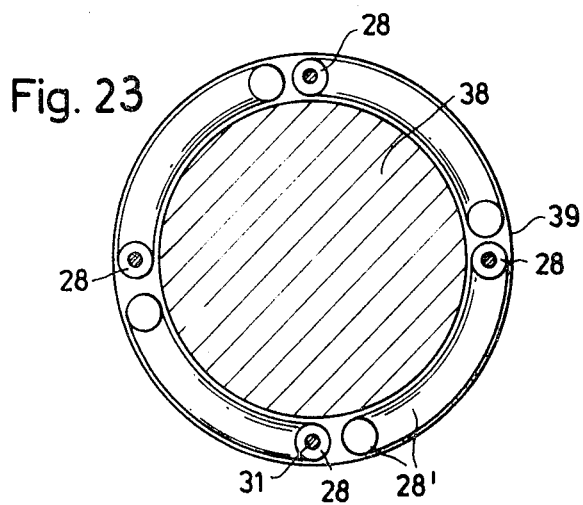
FIG. 23 is a further variation having four hydraulic cylinders guided in a unit having a circular cross section.

FIG. 23 shows a unit 39 having a circular cross section. Carriage 38 is disposed centrally within the unit bearing cylinders 7. The ends 28' of the diametrally disposed cylinders are deflected on circular arcs or in planes which extend tangentially to the carriage.

Figure 24:
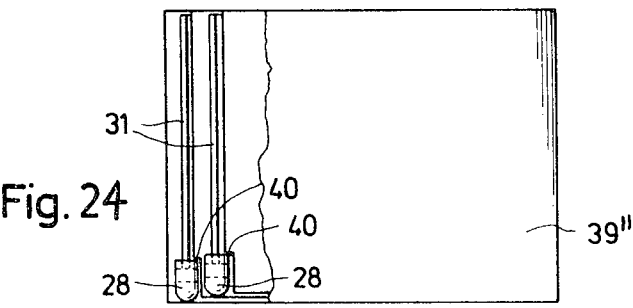
FIG. 24 is a side view, partially broken away, of a telescoping displacement device of arbitrary cross section according to the invention.
Figure 25:
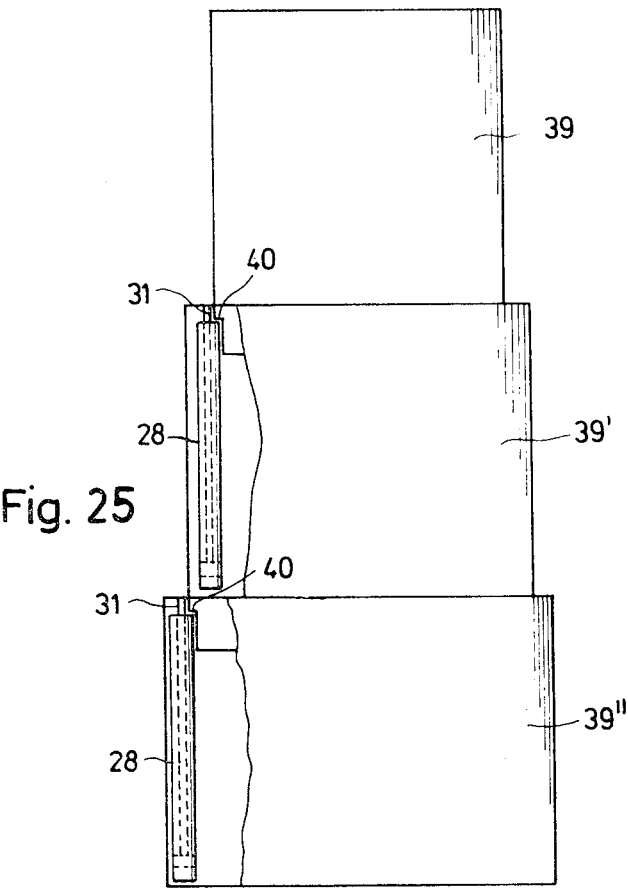
FIG. 25 is the displacement device of FIG. 24 in its extended position.

FIGS. 24 and 25 clearly show how units 39, 39', 39" are brought one inside the other in a telescoping manner. The smaller unit always rests on the cylinder heads disposed in the larger unit by means of an annular collar 40.

In the elevated work platform shown in FIGS. 26 and 27, the paths of movement of the cylinder heads 127', 128', 129' extend in planes or directions, respectively, which are disposed at angles to one another, preferably at right angles. The platform of the transporting vehicle 117 consists of two telescopically displaceable frames 118 and 119. A frame 120 extending at a right angle is permanently connected to frame 118 and bears a rigid unit 121 to serve as the support for the elevated work platform 122. The piston rod 123 of piston 124 is jointed in a transverse bar 125 at the free end of frame 120. The head 127' of flexible cylinder 127 is disposed at piston rod 123 and bears unit 121. If the cylinder chamber above piston 124 is charged with pressure medium, cylinder head 127' moves vertically upwardly along piston rod 123 and pushes unit 121 and the elevated work platform 122 ahead so that it is extended. After a valve is opened to release the pressure medium for discharge, the elevated work platform sinks downwardly under the effect of gravity and takes up the position shown in FIG. 27.

FIG. 26 shows the bed 118, 119 of the transporting vehicle 117 in an elongated state and FIG. 27 shows the same in a retracted state. The two above-mentioned operating positions of the bed differ substantially only in that the axles of the wheels of the transporting vehicle are spaced differently. The area covered by the transport vehicle when the elevated work platform 122 is in its uppermost position is thus substantially increased when the transporting vehicle is in the operating position shown in FIG. 26 where it has a long wheel base as compared with the operating position shown in FIG. 27 where the wheel base is shorter and the elevated work platform is in its lowermost position. In this operating position, the vehicle is particularly suited, for example, for driving in city traffic due to its short length and corresponding mobility. The transporting vehicle is brought from its operating position shown in FIG. 26 into the position shown in FIG. 27 and vice versa with the aid of at least two flexible cylinders or pairs of cylinders, respectively. The cylinder 129 enclosing piston 130 serves to shorten the bed or the wheel spacing. For this purpose piston rod 131 of piston 130 is jointed to a bar 138 at the rearward end of frame 118. The head 129' of flexible cylinder 129 is supported at the transverse bar 137 of frame 119. If the cylinder chamber 133 is charged with pressure medium, the cylinder head 129' disposed at piston rod 131 carries along bar 137 and, thus, the frame 119 of the bed is moved inside frame 118. The extension of the bed is accomplished in a similar manner with the aid of flexible cylinder 128 which encloses piston 134. Piston rod 135 of piston 134 is jointed to transverse bar 136 of frame 118. If the cylinder chamber disposed ahead of piston 134 is charged with pressure medium, the cylinder head 128' disposed at piston rod 135 takes along bar 137 of frame 119 and thus moves frame 119 out of frame 118.

It will be understood that the above description of the present invention is susceptible to various modifications, changes and adaptations, and the same are intended to be comprehended within the meaning and range of equivalents of the appended claims.

What is claimed is:

1. A displacement device disposed on a secondary unit comprising:
   (a) a piston;
   (b) a piston rod jointing said piston to a fixed point on said secondary unit;
   (c) a flexible cylinder enclosing said piston and guided by said piston rod;
   (d) a primary unit serving as a load carrier connected to the head of said cylinder and telescopically disposed in said secondary unit;
   (e) means for charging the space between the head of said cylinder and said piston with a pressure medium for causing said cylinder to move along said piston rod thereby displacing said primary unit; and
   (f) deflection means associated with said secondary unit for deflecting the end of said cylinder opposite said head when said displacement device is in its retracted position.

2. A displacement device as defined in claim 1 further comprising a succession of units each telescopically disposed within the next, and all disposed after said secondary unit, each of said units comprising:
   (a) a piston associated with the unit;
   (b) a piston rod jointing said piston to the preceding unit; and
   (c) a flexible cylinder enclosing said piston and connected at its head to its respective unit.

3. A displacement device as defined in claim 1 wherein said deflection means for deflecting the cylinder end is provided by a guide path of said secondary unit.

4. A displacement device as defined in claim 1 wherein there are two pistons, two piston rods each jointing a respective piston to a respective fixed point on said secondary unit, and two flexible cylinders each enclosing a respective piston and guided by a respective piston rod, and said primary unit is connected to the heads of said two cylinders.

5. A displacement device as defined in claim 4 wherein each of said primary and secondary units is composed of a pair of masts each having a U-shaped cross section, said masts of one said unit being telescopically disposed in said masts of the other said unit, said device further comprising:
   (a) a teritary unit with respect to which said secondary unit is movably disposed;
   (b) two further pistons;
   (c) two further piston rods each jointing a respective further piston to a respective fixed point on said teritary unit;
   (d) two further flexible cylinders each enclosing a respective further piston and guided by a respective further piston rod, each said further cylinder having a head connected to said secondary unit; and
   (e) means for charging the space between the head of each said further cylinder and its respective further piston with a pressure medium for causing each said further cylinder to move along its associated further piston rod thereby displacing said secondary unit relative to said tertiary unit;
   (f) said cylinder being arranged to be disposed in the U-shaped cross sections of said masts of said primary unit when said primary unit is extended relative to said secondary unit and to be deflected between said masts of said primary unit when said primary unit is retracted relative to said secondary unit, and said further cylinders being arranged to be disposed in the U-shaped cross section of said masts of said secondary unit when said secondary unit is extended relative to said tertiary unit and to be deflected between said masts of said secondary unit when said secondary unit is retracted relative to said tertiary unit.

6. A displacement device as defined in claim 5 wherein the guide paths for said cylinders are disposed in extensions of said masts of said primary unit cross one another in the form of an arc so that the ends of said cylinders opposite their said heads cross in the center line of said device when said primary unit is retracted and said load carrier is let down.

7. A displacement device as defined in claim 6 wherein the cylinder end associated with one said mast of said primary unit is deflected by approximately 180° and brought into the guide path of the other said mast of said primary unit.

8. A displacement device in claim 1 wherein said deflection means comprises:
   (a) a rope tow fastened at its one end to the end of said cylinder opposite said head and at its other end to said primary unit, and
   (b) rollers attached to said secondary unit over which said rope tow is guided.

9. Two displacement devices as defined in claim 1 whose flexible cylinders are commonly controllable to produce coaction in a lifting device.

10. A displacement device as defined in claim 1 wherein said means for charging includes a tubular member.

11. A displacement device as defined in claim 1 wherein there are a plurality of cylinders for said primary unit and wherein said secondary unit has a polygonal cross section and said cylinders are disposed in respectively different planes.

12. A displacement device as defined in claim 11 wherein at least one cylinder head is linearly disposed at each corner of said secondary unit.

13. A displacement device as defined in claim 12 wherein said secondary unit has a rectangular cross section and two cylinder heads are disposed in each of two diagonal corners of said secondary unit.

14. A displacement device as defined in claim 13 wherein said cylinders are disposed exclusively in parallel planes to an axis of symmetry of said secondary unit in each operating phase.

15. A displacement device as defined in claim 11 wherein said secondary unit has a triangular cross section and two cylinder heads are linearly disposed in each corner.

16. A displacement device as defined in claim 11 wherein said primary unit is disposed in the center of said secondary unit.

17. A displacement device as defined in claim 1 wherein there are a plurality of cylinders, said secondary unit has a circular cross section and each said cylinder is disposed on a respective circular arc.

18. A displacement device as defined in claim 17 wherein said primary unit is disposed in the center of said secondary unit.

19. Two displacement devices each as defined in claim 1 and permanently connected at right angles to one another for providing displacements in two mutually perpendicular directions.

References Cited
FOREIGN PATENTS

| 1,197,598 | 7/1965 | Germany. |
| 1,274,301 | 8/1968 | Germany. |

EDGAR W. GEOGHEGAN, Primary Examiner

U.S. Cl. X.R.

187—9, 17; 91—196; 92—90, 117 R